Patented Aug. 11, 1942

2,292,694

UNITED STATES PATENT OFFICE 2,292,694

MATERIAL FOR HARD FACING METALLIC OBJECTS

Paul E. Jerabek, Cleveland, Ohio, assignor to The Lincoln Electric Company, Cleveland, Ohio, a corporation of Ohio No Drawing. Application August 7, 1939, Serial No. 288,785

7 Claims. (Cl. 75—136)

This invention relates as indicated to materials for hard facing metallic objects and pertains particularly to the hard facing of metallic objects such as earth working tools, such as scraper and dipper blades and teeth where severe abrasion is encountered. This invention pertains more particularly to the hard facing of metallic objects of the character described by a process wherein a mixture yielding the hard facing alloy is placed on the work and then melted down by means of an electric arc.

It is a principal object of my invention to provide materials for hard facing which will produce an ultimate hard facing material which has superior properties not possessed by any material previously available. It is a further object of this invention to provide a material for use in the process defined which operates in a superior way in that a much smoother and denser hard surfacing layer may be provided and by the use of the present invention the application of much thinner layers of hard facing material is made possible. Other objects of my invention will appear as the description proceeds.

To the accomplishment of the foregoing and related ends, the invention, then, comprises the features hereinafter fully described, and particularly pointed out in the claims, the following description setting forth in detail certain illustrative embodiments of the invention, these being indicative, however, of but a few of the various ways in which the principle of the invention may be employed.

Broadly stated, this invention comprises the discovery that a superior hard facing material of the character described may be provided by including a boride in the mixture of materials which are placed on the work to be hard surfaced and melted down by means of an electric arc to produce an alloy composition of the character in which chromium has the dominating alloy in effect.

It will be observed that I have referred generally to the alloy compositions which are used in accordance with my invention in hard surfacing as those which are characterized by the fact that chromium is the alloy element present which has the dominating effect. This is a class of alloys with which the workers in the art are generally familiar and is intended to include that broad class of alloy compositions which have been found to be particularly suitable for use in the hard surfacing of metallic articles. While as presently indicated, my invention finds its greatest utility in a certain class of alloy compositions, nevertheless my invention is to be construed broadly as comprising the discovery that the addition of a boride in the mixture from which is melted down the hard facing material to the end that a substantial amount of boron is included in the ultimate composition, results in unexpectedly improved results.

As previously indicated, a hard surfacing composition made in accordance with my invention is produced by laying down a mixture of finely divided materials onto the work to be hard surfaced and then melting down such materials by means of an electric arc. The mixture of materials thus placed on the work and melted by the arc may comprise the following:

Ferrochromium from about 30% to about 90%
Nickel metal from an effective amount to about 30%
Ferromanganese from an effective amount to about 15%
Calcium boride from about 2% to about 7%

The ferrochromium which I have employed contains about 6% carbon, about 65% chromium and about 30% iron. The ferromanganese contains about 7% carbon, about 80% manganese and about 13% iron. The calcium boride contains about 53% boron, 10% iron, 2% carbon and about 35% calcium.

The following is a specific composition of a mixture which I have found very satisfactory:

| | Per cent |
|---|---|
| Ferrochromium | About 80 |
| Nickel metal | About 10 |
| Ferromanganese | About 5 |
| Calcium boride | About 5 |

This mixture of materials in finely divided and thoroughly intermixed form is placed in the dry state onto the article to be hard surfaced and the mixture then melted down by means of an electric arc, preferably maintained between a carbon electrode placed in arcing relation to the work on which the powdered mixture is supported.

It is of course possible to secure the same resultant alloy composition as a hard facing material by means other than the specific mixtures above-identified. Thus for example, one or more of the constituents of the ultimate alloy may be included in a filler rod or metallic electrode and the powder melted down by means of a metallic arc instead of a carbon arc. Irrespective of the manner in which the alloying constituents are brought together on the work, the resultant hard facing material should have a composition substantially as follows:

Chromium from about 25% to about 80%
Nickel from about 5% to about 30%
Carbon from about 1% to about 7%
Boron from an effective amount to about 4%
Manganese from none to about 15%
Molybdenum from none to about 20% with the remainder being substantially all iron together with such other alloying elements and impurities as are sometimes found in hard surfacing materials of the character in which chromium is the alloying element having the dominating effect.

A somewhat narrower range of percentages of the various elements in the hard surfacing alloy produced in accordance with my invention is as follows:

Chromium from about 35% to about 65%
Nickel from about 8% to about 15%
Carbon from about 3% to about 5.5%
Boron from an effective amount to about 3%
Manganese from an effective amount to about 6%
Molybdenum from an effective amount to about 15% the remainder being substantially all iron together with such alloying elements and impurities as are sometimes found in alloy compositions of the character in which chromium is the alloying element having the dominating effect.

A still narrower and a very much preferred range of percentages within which the alloying elements may be present in the ultimate hard facing material is as follows:

Chromium from about 50% to about 60%
Nickel from about 10% to about 12%
Carbon from about 3.5% to about 4%
Boron from about .2% to about 2.00%.
Manganese from an effective amount to about 5%
Molybdenum from an effective amount to about 10% the remainder being substantially all iron together with such other alloying elements and impurities as are sometimes found in alloy compositions of this type.

The ferromanganese yielding manganese in the ultimate composition within the percentages above given, is desirably employed in the mixture primarily for its effect on the slag which is produced during the melting and which floats on top of the melted metal. The ferromanganese added to the mixture produces a very fluid slag which is uniformly distributed over the pool of metal so that no depressions resulting from segregated islands of slag occur in the metal as it finally solidifies. Manganese may have same beneficial effect in the alloy although satisfactory results may be secured by omitting entirely ferromanganese from the mixture and thus the manganese from the ultimate composition. Molybdenum is added to the composition for the purpose of increasing the resistance to certain types of corrosion of the hard surface material, although here again, entirely satisfactory deposits have been produced which have contained no molybdenum.

Tungsten may be employed in partial substitution of molybdenum, if desired, although if too great a percentage of tungsten is employed the hard facing composition has a tendency to become brittle and thus is subject to easy cracking.

The presence of the boron in the mixture as a boride and as boron in the ultimate composition is of primary importance. The use of calcium boride in the granulated mixture from which the hard surfacing material is melted down gives several important results. In the first place, it serves as a source for the boron in the final deposit. In the second place, calcium boride has been found to be a very effective arc stabilizer and assures an ease of operation of the arc in melting down the granulated material which has not been secured or even approached in compositions from which calcium boride has been omitted. It also imparts fluidity to the molten metal and the ability of the molten metal to "wet" the underlying solid metallic surface more readily. In this way a much thinner smoother and more uniform deposit is possible when calcium boride is used than when it is omitted. Calcium boride is also a powerful deoxidizer and the products of its oxidation form an easily fusible slag which floats on the surface of the pool of molten metal as a continuous fluid film which does not have a tendency to segregate either in islands or along the edge of the bead to cause pitting or undercutting.

Borides of other materials than calcium may be employed, such as for example, the borides of strontium and barium, these being similar in their effect to calcium boride but are not as commercially available at the present time as calcium boride. Other borides have been found beneficial although not quite to the extent of calcium boride. Such borides include manganese boride, titanium boride, boron carbide, ferroboron and manganese boron.

A layer of hard surfacing material in accordance with my invention after being melted down by the arc is ready for use without any further treatment and no particular conditions must be observed during the cooling of the alloy since I have found that the rate of chilling of the alloy has little effect on its structure. After the arc has passed over the granulated material melting down the alloy therefrom, the layer of slag may be readily brushed off and the hard surfaced article is then ready for use.

Other modes of applying the principle of the invention may be employed, change being made as regards the details described, provided the features stated in any of the following claims, or the equivalent of such, be employed.

I therefore particularly point out and distinctly claim as my invention:

1. A material for hard facing metallic articles by melting the same onto the surface to be faced by means of an electric arc, which comprises a mixture yielding substantial amounts of iron, carbon, chromium and nickel, and which also contains a substantial amount of a boride, without, however, containing any substantial amount of tungsten.

2. As a material for hard facing metallic articles by melting the same onto the surface to be faced by means of an electric arc, a mixture which as thus melted yields substantial amounts of chromium and nickel with characterizing amounts of carbon and iron, and which mixture also contains a characterizing amount of a boride, without, however, containing any substantial amount of tungsten.

3. A material for hard facing metallic articles by melting the same onto the surface to be faced by means of an electric arc which comprises a mixture which when melted down yields an alloy comprising from about 1% to about 7% carbon, from about 30% to about 65% chromium, from about 5% to about 40% nickel, from about 20% to about 40% iron, and which mixture also contains a minor amount of a boride, without, however, containing any substantial amount of tungsten.

4. A material for hard facing metallic articles by melting the same onto the surface to be faced by means of an electric arc which comprises a mixture which when melted down yields a substantially tungsten-free alloy composition comprising from about 1% to about 7% carbon, from about 30% to about 65% chromium, from about 5% to about 40% nickel, from about .25% to about 5% boron, from about 20% to about 40% iron.

5. A hard facing material for metallic articles, comprising materials which when melted onto the surface to be faced by an electric arc will yield a substantially tungsten-free alloy of substantially the following composition:

Chromium from about 25% to about 80%
Carbon from about 1% to about 7%
Nickel from about 5% to about 30%
Boron from an effective amount to about 4% and the remainder being substantially all iron together with such alloying elements and impurities as are sometimes found in hard surfacing alloy compositions.

6. A hard facing material for metallic articles, comprising an alloy of substantially the following composition:

Chromium from about 50% to about 60%
Carbon from about 3.5% to about 4.00%
Nickel from about 10% to about 12%
Boron from about .2% to about 2.00%
Manganese from an effective amount to about 5%
Molybdenum from an effective amount to about 10% and the remainder being substantially all iron together with such alloying elements and impurities as are sometimes found in hard surfacing alloy compositions.

7. A material for hard facing metallic articles by melting the same onto the surface to be faced by means of an electric arc, which comprises a mixture containing on the order of about 80% ferrochromium, 10 parts nickel metal, 5 parts ferromanganese, and 5 parts calcium boride.

PAUL E. JERABEK.